(12) United States Patent
Taves

(10) Patent No.: US 10,899,621 B2
(45) Date of Patent: Jan. 26, 2021

(54) SYSTEM AND METHOD FOR PREPARING GRAPHENE OXIDE AND REDUCED GRAPHENE OXIDE

(71) Applicant: Nano Trek Holdings, LLC, Scottsdale, AZ (US)

(72) Inventor: Anthony B. Taves, Phoenix, AZ (US)

(73) Assignee: NANO TREK HOLDINGS, LLC, Scottsdale, AZ (US)

( * ) Notice: Subject to any disclaimer, the term of this patent is extended or adjusted under 35 U.S.C. 154(b) by 177 days.

(21) Appl. No.: 16/026,017

(22) Filed: Jul. 2, 2018

(65) Prior Publication Data

US 2019/0002292 A1     Jan. 3, 2019

Related U.S. Application Data

(60) Provisional application No. 62/527,743, filed on Jun. 30, 2017.

(51) Int. Cl.
*C01B 32/192* (2017.01)
*C01B 32/198* (2017.01)
*B01J 19/00* (2006.01)

(52) U.S. Cl.
CPC .......... *C01B 32/192* (2017.08); *B01J 19/0013* (2013.01); *C01B 32/198* (2017.08); *C01B 2204/04* (2013.01); *C01P 2002/01* (2013.01); *C01P 2002/72* (2013.01); *C01P 2002/82* (2013.01); *C01P 2004/04* (2013.01)

(58) Field of Classification Search
CPC ................ C01B 32/192; C01B 2204/04; B01J 19/0013; C01P 2002/01; C01P 2002/72; C01P 2002/82; C01P 2004/04
See application file for complete search history.

(56) References Cited

U.S. PATENT DOCUMENTS

| 2015/0259212 A1* | 9/2015 | Li | B82Y 40/00 428/221 |
| 2016/0130151 A1* | 5/2016 | Kurungot | C01B 32/194 502/180 |
| 2016/0311688 A1* | 10/2016 | Zhang | C01B 32/23 |

FOREIGN PATENT DOCUMENTS

| CN | 104291331 A * | 1/2015 |
| KR | 101565484 B1 * | 11/2015 |

OTHER PUBLICATIONS

Tavakoli, Farnosh, Masoud Salavati-Niasari, and Fatemeh Mohandes. "Green synthesis and characterization of graphene nanosheets." Materials Research Bulletin 63 (2015): 51-57.*

(Continued)

*Primary Examiner* — Richard M Rump
(74) *Attorney, Agent, or Firm* — Dickinson Wright PLLC

(57) ABSTRACT

There is provided an industrially scalable system and method for preparing graphene oxide and thereafter reduced graphene oxide, with high yields (generally better than 98 percent), in which the yield and quality are maximized. In certain embodiments of the present method and process, the initial particle size of the graphite charge and the temperature profile are of greater importance to a successful outcome than the reactants themselves. It should be noted that unlike the previous Hummers methods and derivatives, secondary oxidizers and exfoliation agents such as nitric acid, sodium nitrate and similar intercalation agents are not necessary to achieve the desired result.

23 Claims, 18 Drawing Sheets

(56) References Cited

OTHER PUBLICATIONS

Lv, Ya Nan, et al. "Synthesis of Stable Colloidal Suspension of Graphene." Applied Mechanics and Materials. vol. 328. Trans Tech Publications Ltd, 2013.*
English machine translation of KR101565484B1 (2015).*
Alazmi, Amira, et al. "Comparative study of synthesis and reduction methods for graphene oxide." Polyhedron 116 (2016): 153-161.*

* cited by examiner

Partially exfoliated graphite precursor is many-layer and edge connected.

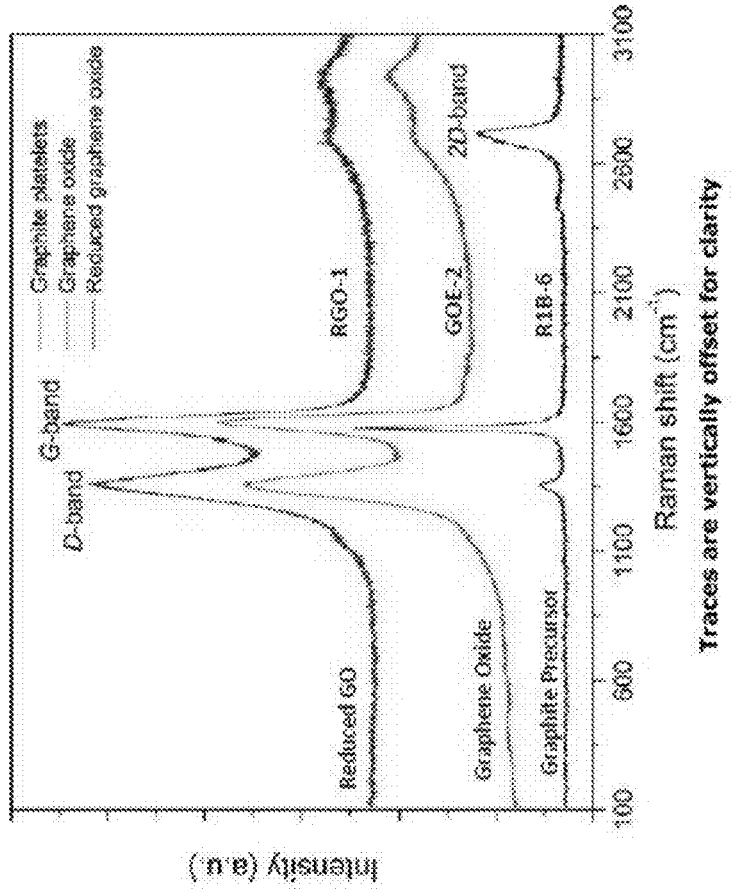

Raman Spectra typical of the materials utilized and produced by the process herein described

- The Raman spectra of RGO-1 and GOE-2 match well with what is reported in literature for reduced GO and GO respectively. This indicates that RGO-1 is graphene, as the 2D-band is more prominent in it, compared to GOE-2. The prominence of the D-band in RGO-1 indicates high relative disorder, a characteristic of single layer graphene.
- R1B-6 is closer to Graphite than Graphene and consists of many thousands of partially exfoliated, edge-connected layers

Fig. 8

Raman Peak Positions

| Sample ID | D-Band (cm$^{-1}$) | G-Band (cm$^{-1}$) |
|---|---|---|
| RGO-#1 Reduced GO | 1332.48 | 1585.40 |
| GOE-#2 GO in Ethanol | 1333.85 | 1600.43 |
| GO-H2O-#3 GO in Water | 1341.96 | 1592.12 |
| B1M-#4 10 Gram Master Batch | 1343.60 | 1603.17 |
| B2M-#5 30 Gram Master Batch | 1344.97 | 1593.77 |
| R1B-#6 Graphite Precursor | 1335.12 | 1588.88 |

Fig. 17

SYSTEM AND METHOD FOR PREPARING GRAPHENE OXIDE AND REDUCED GRAPHENE OXIDE

CROSS REFERENCE TO RELATED APPLICATIONS

This application claims full benefit of and priority to U.S. provisional patent application No. 62/527,743 filed Jun. 30, 2017 titled, "Method for Preparing Graphene Oxide and Reduced Graphene Oxide," the disclosure of which is fully incorporated herein by reference for all purposes.

FIELD AND BACKGROUND OF THE INVENTION

Field of the Invention

The present invention relates to a system and method and process for preparing graphene oxide (GO) and reduced graphene oxide (RGO). More particularly, the present invention addresses a system and method for producing GO and RGO with high yields and high process repeatability regardless of batch size.

Background of the Invention

Graphite oxide was first reported by Brodie in 1859. Since the initial publication, various groups have followed this method to synthesize graphite oxide, to fabricate graphene, and to study the functionalization of graphite and graphene oxides. In 1898, a modified method (the Staudenniaier-Hofmann-Hamdi method) was reported. Primarily laboratory curiosities, both of these processes require long reaction times (up to 300 hours) and involved extreme reaction kinetics that often result in the spontaneous ignition or explosion of the reactants. Therefore, a relatively rapid and somewhat safer method, the Hummers method, was developed for preparing graphene oxide, in which sulfuric acid, sometimes nitric acid, sodium nitrate, graphite flakes, and potassium permanganate are mixed slowly in sequence, followed by addition of deionized (DI) water at a controlled rate to form graphene oxide. Recently, other methods using oxidizers such as benzoyl peroxide or hydrazine and fine graphite powders have been reported. Typically these processes require high pressure reactors, heating at greater than 100° C. over similarly long processing times and are also subject to thermal runaway and explosion. As a result, the Hummers method remains the most popular due to its relative safety and shorter reaction times compared to the other processes. None of these methods however really lend themselves to the levels of scaling, yield and repeatability required for successful and economic commercial or industrial production.

Graphene oxide production by the Hummers method has, since its inception, suffered from unreliable yields, often between 70 and 85 percent and poor repeatability in terms of the process itself, manifesting as apparently random failures on a batch by batch basis, wherein no significant graphene oxide is produced. This seemingly random failure rate often approaches 40 percent and results in the loss of all of the reactants which are generally unrecoverable. In prior processes, spontaneous ignition of the reactants and the explosion of Manganese Heptoxide (produced in the initial stages of the Hummers reaction) is typically problematic, particularly in the first five to forty minutes of the Hummers and derivative processes.

Complex ice bath and other cooling procedures have been devised to prevent the catastrophic effects of localized heating and thermal runaway during the initial stages of the process. Unfortunately, without close supervision and manual intervention, the ice bath approach keeps the temperature too low during the formative stages of the reaction and is responsible for batch failures that will only be discovered at the end of the process.

The successful optimization of the synthesis conditions of Hummers and derivative methods has not yet been reported nor confirmed in the literature. What is needed, then, is an improved process over prior processes to prepare graphene oxide and reduced graphene oxide in an efficient, scalable and repeatable manner.

SUMMARY OF THE INVENTION

The following technical disclosure is exemplary and explanatory only and is not necessarily restrictive of the invention as claimed.

Aspects of the present invention provide an industrially scalable system and method for preparing graphene oxide (also referred to herein as "GO") and thereafter reduced graphene oxide (also referred to herein as "RGO"), with high yields (generally better than 98 percent), in which the yield and product quality are maximized. In contrast to prior methods, the present invention may provide for process repeatability approaching 100%.

In certain embodiments of the present method and process, the initial particle size of the graphite charge and the temperature profile are of greater importance to a successful outcome than the reactants themselves. It should be noted that unlike the previous Hummers methods and derivatives, secondary oxidizers and exfoliation agents such as nitric acid, sodium nitrate and similar intercalation agents are not necessary to achieve the desired result.

In one preferred embodiment a method of the present invention comprises chilling a reaction vessel to a predetermined chill temperature; intermixing a quantity of two or more acid reactants to form an intermixed acid mixture; chilling the intermixed acid mixture to the predetermined chill temperature; intermixing a quantity of $KMnO_4$ and a quantity of graphite;

chilling the intermixed $KMnO_4$ and graphite to the predetermined chill temperature; placing the chilled intermixed acid mixture into the chilled reaction vessel and initiating a low speed agitation of the acid mixture; adding the chilled intermixed $KMnO_4$ and graphite to the chilled reaction vessel to form a graphite suspension; continuing agitation of the reaction vessel for a predetermined period of cool agitation while maintaining the reaction vessel within a predetermined cool temperature profile; adding a first volume of warm distilled water during a first period of warm agitation while the graphite suspension is agitated; adding a second volume of distilled water during a second period of warm agitation while the graphite suspension is agitated; while agitating, cooling the graphite suspension to a predetermined pre-peroxide temperature; adding a predetermined amount of hydrogen peroxide to the reaction vessel; allowing contents of the reaction vessel to cool and settle over a settling period; and separating colloidal graphene oxide from reaction products within the vessel contents. The graphene oxide produced by aspects of this invention may be reduced to graphene by any desired method, such as by adding ascorbic acid to the colloidal graphene oxide while agitating and maintaining the colloidal graphene oxide/ascorbic acid mixture at a predetermined reduction temperature; allowing the colloidal graphene oxide/ascorbic acid mixture to cool to an ambient temperature for a determined reduction period. As mentioned in more detail below, careful attention to temperature management improves yield and quality of the process, in addition to preventing potential hazardous situations. For example, the pre-chilling process may utilize a predetermined chill temperature of approximately 0 degrees C.

Various aspects of the invention provide for specific contents and ratios of components. For example, the two or more acid reactants may include a quantity of $H_2SO_4$ and a quantity of $H_3PO_4$. Further, the intermixed acid mixture may comprise sulfuric acid and phosphoric acid in a ratio of approximately 75/25 by volume, respectively. Additionally, a ratio of the quantity of $KMnO_4$ and the quantity of graphite may be approximately 3 to 1 by weight, respectively.

Various steps in the processes of the present invention provide for configuration and timing of process steps. For example, the graphite suspension placed into the chilled reaction vessel may be placed in gaseous communication with atmospheric oxygen, or alternatively, in various embodiments, gaseous oxygen may be provided to the reaction vessel. In one embodiment, the predetermined period of cool agitation comprises a period of about four to eight hours, and further, the predetermined cool temperature profile comprises one or more of: maintaining a temperature of the graphite suspension below 50 degrees C. over the first 90 minutes of the predetermined period of cool agitation; providing a continuously rising temperature profile of the graphite suspension from about zero degrees C. to about 45 degrees C., over an initial 60 to 90 minutes of the predetermined period of cool agitation; maintaining a temperature profile of the graphite suspension to prevent temperatures from plateauing for more than five minutes during the predetermined period of cool agitation; maintaining temperature of the graphite suspension between 40 and 45 degrees C. with a PID thermal control loop; and cooling the graphite suspension during a first 15 to 30 minutes of the predetermined period of cool agitation and thereafter allowing the temperature the graphite suspension to rise to between 40 to 45 degrees C. over about 90 minutes of the predetermined period of cool agitation and then remain at a temperature between 40 to 45 degrees C. a remainder of the predetermined period of cool agitation.

During the warm/hot stages of embodiments of the reaction process, the first volume of warm distilled water may be heated to 50 to 80 degrees C., and the first period of warm agitation may comprise a period of time from 45 to 60 minutes. In one aspect, the first volume of warm distilled water is selected to be approximately equal to a volume of the intermixed acid mixture. Further, the first volume of warm distilled water may be added to the reaction vessel at a controlled rate between 2 ml/min and 5 ml/min so as to maintain a temperature of contents of the reaction vessel between 80 and 90 degrees C. To assist in this process, the reaction vessel may further comprise a PID thermal control loop and a heating and/or cooling apparatus interface to maintain temperature profiles and temperature ranges mentioned herein.

In another aspect, a second quantity of warm distilled water is added, wherein the second volume of warm distilled water is approximately equal to a volume of the intermixed acid mixture. The second quantity of warm water may be heated to any desired temperature, and in one embodiment, to approximately 90 degrees C. After addition of the second quantity of warm distilled water, as described in more detail below, hydrogen peroxide is added in various embodiments, and the predetermined pre-peroxide temperature may be approximately 50 degrees C., and in various embodiments, may have a concentration of the hydrogen peroxide is 35% by volume. In yet another aspect, a volume of the hydrogen peroxide used may be approximately equal to one half an initial volume of $H_2SO_4$ used in the intermixed acid mixture.

Any desired reaction vessel and agitation component may be utilized to achieve the goals of the present invention. For example, the agitation may comprise stainless steel multi-wire whip rotating within the reaction vessel at a predetermined speed. Any desired reaction vessel and type may be utilized as described in more detail below.

After the above mentioned steps, in various embodiments a settling period may occur, such as a settling period being in the range of 12 to 14 hours. Additional aspects of the invention include the predetermined reduction temperature being within the range of 40 to 50 degrees C., and the predetermined reduction period ranges from one of: 1 to 10 hours; until the graphene oxide/ascorbic acid mixture obtains ambient temperature; or about 24 hours.

Also provided are specific examples of components used in performing the method of the present invention. For example, in one implementation, the intermixed acid mixture comprises approximately 300 ml of 98% $H_2SO_4$ and 100 ml of 85% $H_3PO_4$; the $KMnO_4$ comprises approximately 30 grams of potassium permanganate; the graphite comprises approximately 10 grams of flake graphite between about 50 and 250 mesh in size; the first volume of warm distilled water comprises approximately 400 ml of distilled $H_2O$; the second volume of warm distilled water comprises approximately 400 ml $H_2O$; and predetermined amount of hydrogen peroxide comprises approximately 150 ml of 35% $H_2O_2$. In another example, herein: the intermixed acid mixture comprises approximately 900 ml of 98% $H_2SO_4$ and 300 ml of 85% $H_3PO_4$; the $KMnO_4$ comprises approximately 90 grams of potassium permanganate; the graphite comprises approximately 30 grams of flake graphite between about 50 and 250 mesh in size; the first volume of warm distilled water comprises approximately 1200 ml of distilled $H_2O$; the second volume of warm distilled water comprises approximately 1200 ml $H_2O$; and predetermined amount of hydrogen peroxide comprises approximately 450 ml of 35% $H_2O_2$.

BRIEF DESCRIPTION OF THE DRAWINGS

A more complete understanding of the present invention may be derived by referring to the detailed description and claims when considered in connection with the following illustrative figures.

FIG. 8 illustrates comparative Raman spectra typical of materials produced by a process of the present invention.

FIG. 17 illustrates the Raman peak positions of all of the samples herein described.

DETAILED DESCRIPTION OF THE PREFERRED EMBODIMENTS

Figure 1:
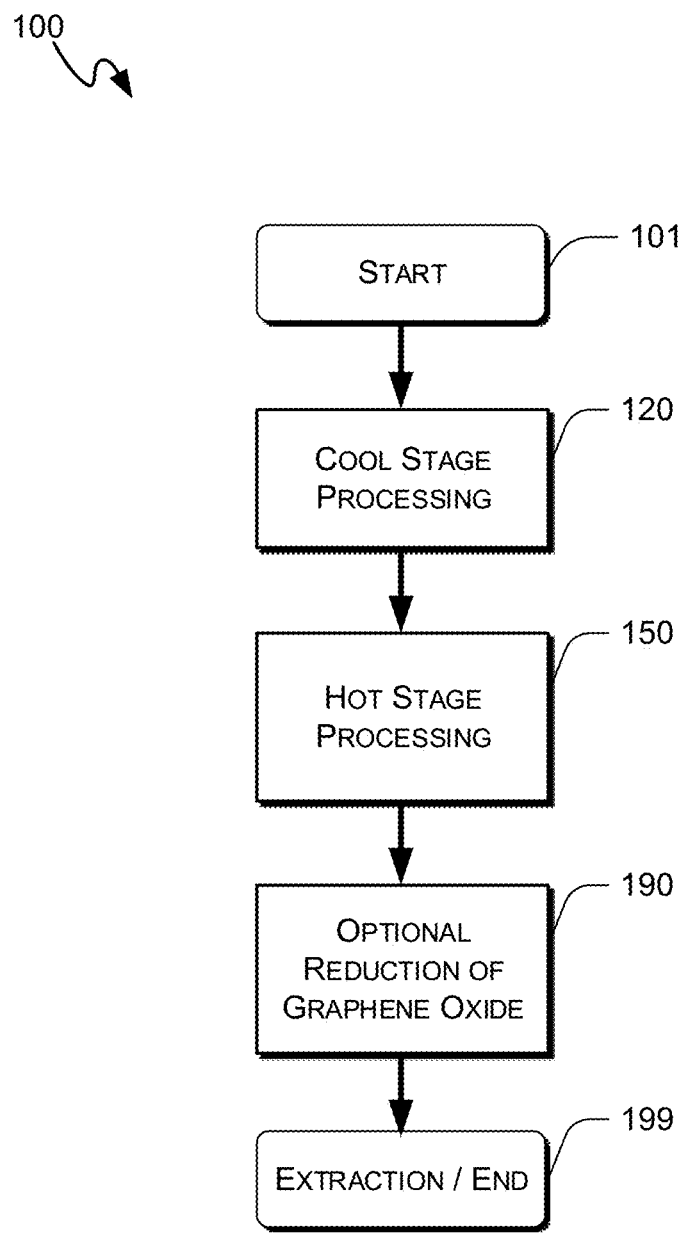
FIG. 1 provides an overall flow diagram of a process of the present invention.
Figure 19:
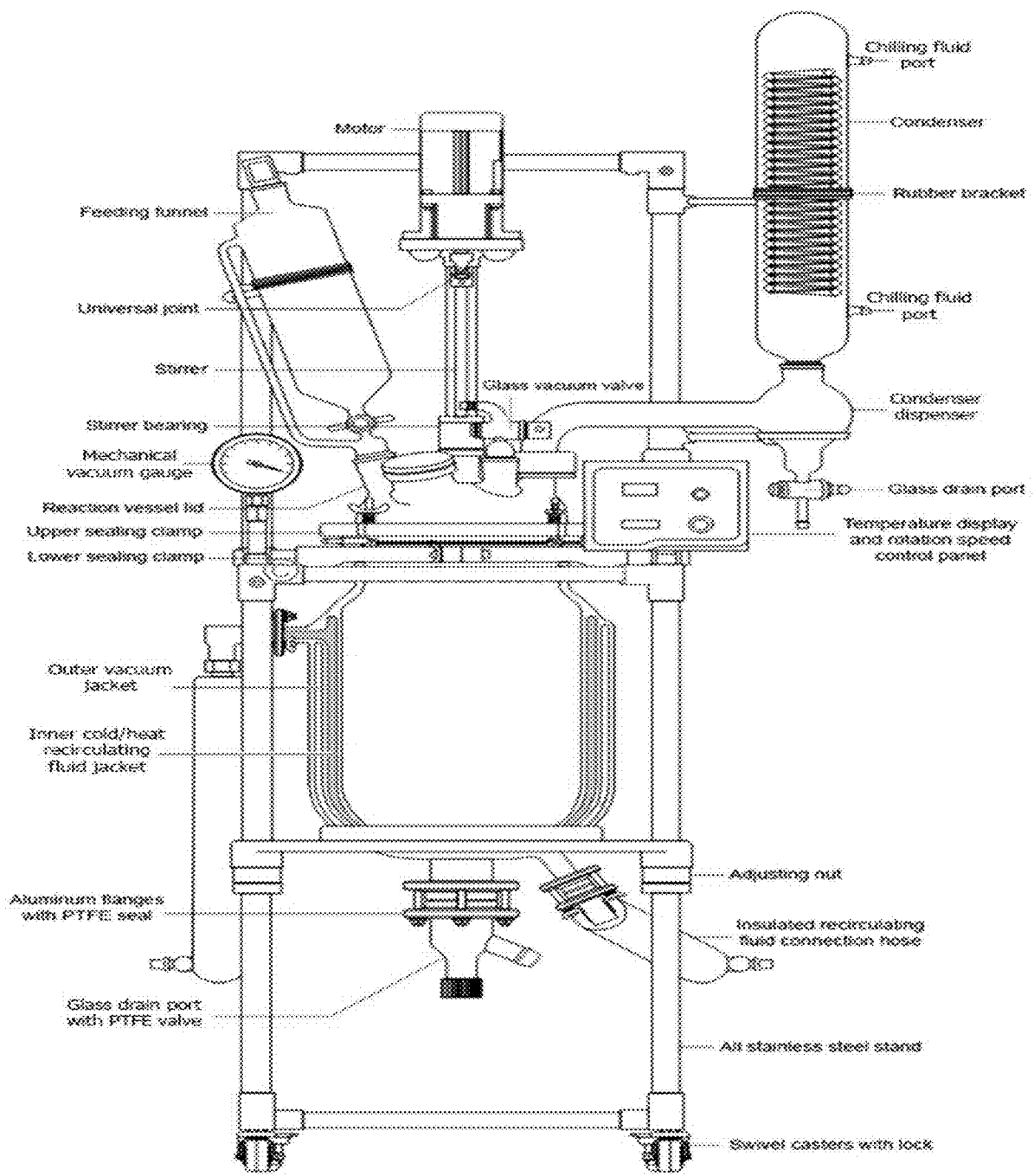
FIG. 19 depicts a cross-section schematic of a Reaction Vessel utilized in various processes of the present invention.

Referring now in detail to the drawing figures, where like reference numerals represent like parts throughout the several views, FIG. 1 shows a flow diagram depicting the overall process 100 of the present invention. As described in more complete detail below, the process begins with a cool stage process step 120 (discussed in more detail in association with FIG. 2), followed by a hot stage process step 150 (discussed in more detail in association with FIG. 3), and an optional reduction of graphene oxide step 190 (discussed in more detail in regards to FIG. 4). An exemplary embodiment of a reaction vessel which may be utilized in accord with methods of the present invention is depicted in FIG. 19.

One aspect of the present invention provides a method and process for preparing graphene oxide, in a one-pot, two-stage process comprising:

Stage 1. Cool Stage: (See Generally FIG. 1, 120, and FIG. 2)

Figure 2:
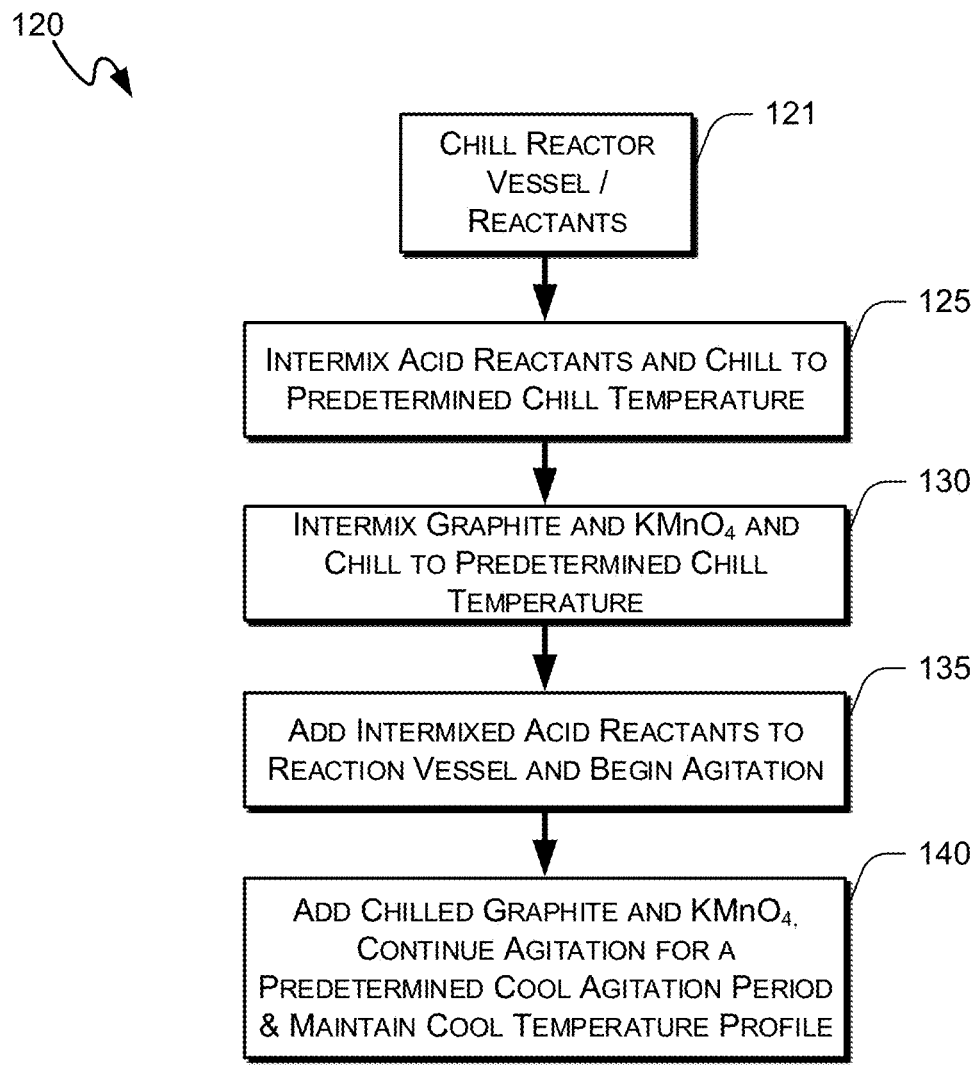
FIG. 2 provides a more detailed flow diagram of the cool stage processing of an embodiment of the present invention.
Figure 3:
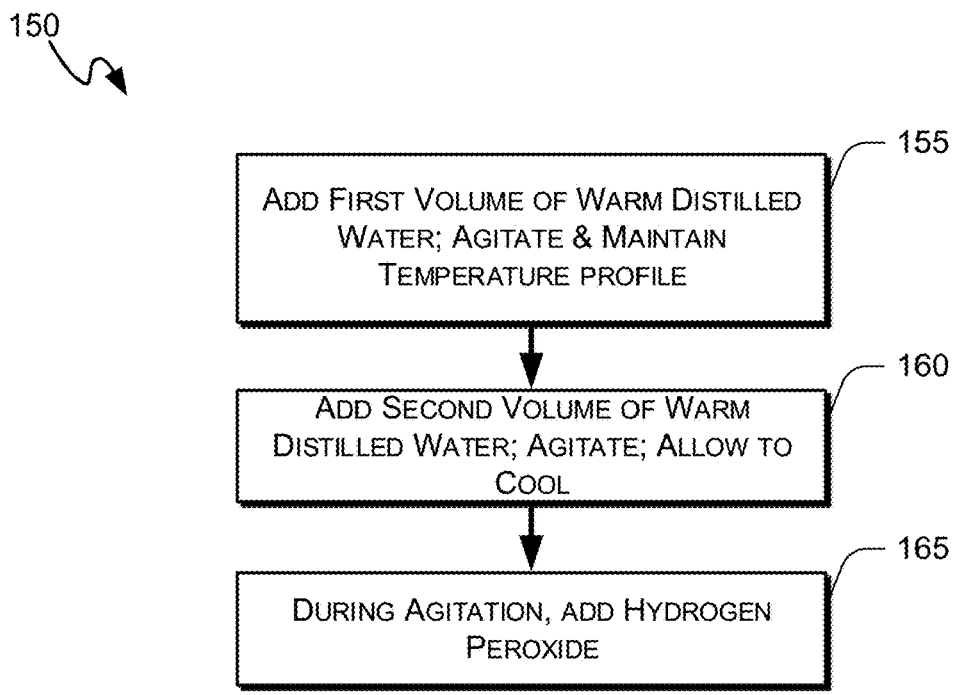
FIG. 3 provides a more detailed flow diagram of the hot stage processing of an embodiment of the present invention.

(a) Chilling the required quantities of all the reactants to approximately 0 degrees C. (FIG. 2, 121);

(b) Chilling a reaction vessel (such as a hemispheric bowl or low-boy beaker) to 0 degrees C. (FIG. 2, 121);

(c) Premixing the desired quantities of $H_2SO_4$ and $H_3PO_4$ (an exothermic reaction) and then re-chilling to approximately 0 degrees C. (FIG. 2, 125);

(d) Premixing the desired quantities of graphite and $KMnO_4$ together and then chilling to approximately 0 degrees C. (FIG. 2, 130);

(e) Placing the chilled acid mix into the chilled vessel and placing the vessel into an agitating configuration, such as placing onto a low speed (e.g., less than 200 rpm) planetary mixer with a stainless steel multi-wire whip (FIG. 2, 135).

In one preferred approach, agitation may be accomplished by stirring with a wire whip, as it imparts a continuous force-in-shear to the contents of the beaker, initiating exfoliation and also whips atmospheric oxygen into the batch over the entire course of the reaction.

(f) With the mixer running, adding (preferably, immediately) the entire volume of mixed, chilled graphite and $KMnO_4$ to the chilled reaction vessel (FIG. 2, 140).

One object of pre-chilling both the apparatus and the reactants is to reduce and control the temperature profile due to the exothermic nature of the starting reactions. Maintaining a planned temperature profile assists particularly during approximately the first 60 to 90 minutes of the process and may prevent both long term over heating as well as localized "hot spots" that could otherwise lead to spontaneous ignition and explosion.

In various embodiments, it is necessary to maintain a continuously rising temperature profile, from zero to about 45 degrees C., over the first 60 to 90 minutes (or longer depending on increasing batch sizes). Allowing the temperature to plateau for any significant period of time or to retrograde during this period may result in increasing percentages of unreacted graphite at the end of the process. Further, allowing the temperature to exceed 50 degrees C. at any point during the first 90 minutes may likely result in batch failures, perhaps catastrophic in nature. A single instance of localized overheating and ignition, even if recovered by vigorous stirring, may contaminate the batch with a form of "burned" carbon that leads to unpredictable levels of unreacted graphite at the end of the process.

Both the material and surface area of the reaction vessel are of some importance for controlling the temperature profile over the entire course of the process. Both glass and ceramics are relatively poor conductors of heat and this fact mitigates in favor of their use, whereas metallic vessels may radiate an excessive amount of heat, resulting in a retrograde temperature profile early in the process.

Low Boy beakers and more preferably, hemispheric vessels, in both glass and ceramics, provide sufficient emissivity and surface area for the controlled removal of heat by radiation and atmospheric convection. Generally speaking, the size of the reaction vessel, for both materials, should be at least approximately equal to the calculated volume of contained fluids at the end of step (j) or approximately 1,500 ml and 4,200 ml respectively as in example batches #1 and #2 set forth herein below.

(g) The process continues with stirring (preferably continuously) for four to eight hours, as stated above, to obtain a relatively fine graphite particle suspension. The temperature will likely rise to 40 to 45 degrees C. over the first 90 minutes and then, if not controlled, drop to about 37 degrees C. over the next two hours. Artificially maintaining the temperature between 40 and 45 degrees C. with a PID thermal control loop can simplify the process will increase the reaction efficiency and reduce the quantity of unreacted graphite at the end of the second stage.

During the reaction process, ice baths and/or other ancillary cooling methods are generally not required with methods of the present invention, but may be kept on hand for emergency purposes or for auxiliary temperature management. Temperature of the batch should preferably remain below 50 degrees C. over the first 90 minutes in order to prevent the spontaneous ignition and subsequent detonation of Manganese Heptoxide produced during the first few minutes of the reaction.

In one preferred approach, the reaction requires extreme cooling (depending on the size of the batch) typically during the first 15 to 30 minutes and thereafter requires that the temperature be allowed to rise to 40 to 45 degrees C. over about 90 minutes and then remain at this level for the duration of the "cool" processing stage of 4 to 8 hours, depending on the starting particle size.

Stage 2. Hot Stage: (See Generally FIG. 1, 150, and FIG. 3)

(h) The process continues with adding (FIG. 3, 155) a desired volume of warm (50 to 80 degrees C.) distilled water at a controlled rate into said graphite suspension over a period of 45 to 60 minutes, while stirring, to control the yield of graphene oxide and commence secondary exfoliation. The specified quantity of distilled water is added, for example, at a controlled rate between 2 ml/min and 5 ml/min so as to maintain the temperature of the batch between 80 and 90 degrees C. The reaction is exothermic and the inclusion of a PID thermal control loop can simplify the process.

(i) After step "h" is completed, next another (preferably identical) volume of 90 degree C. distilled water is added (FIG. 3, 160) to the vessel to further dilute the contents and extend the reaction time.

(j) While stirring, the process continues by allowing the batch to cool (FIGS. 3, 160) to 50 degrees C. and then adding a specified amount of 35% hydrogen peroxide (FIG. 3, 165) to halt the manganese reaction, hyper-oxygenate the batch, and to complete the exfoliation to single and/or few layer graphene oxide. Two Example configurations of the components of this process are illustrated below:

Example #1

In a preferred embodiment, one example of a smallest practical processed graphite batch size may include a 10 gram batch and comprises:
  300 ml of 98% $H_2SO_4$
  100 ml of 85% $H_3PO_4$
  30 grams of $KMnO_4$
  10 grams of Flake graphite (between 50 and 250 mesh)
  400 ml $H_2O$ (Distilled water for step "h")
    (preferably, RO water should not be used)
  400 ml $H_2O$ (Distilled water for step "i")
    (preferably, RO water should not be used)
  150 ml of 35% $H_2O_2$ (step "j")
  Note: Total final fluid volume (end of process) in the reactor for Example 1 is approximately 1,350 ml.

Example #2

In another preferred embodiment, an effective initial batch size (in terms of processed graphite) would be a 30 gram batch and comprises
  900 ml of 98% $H_2SO_4$
  300 ml of 85% $H_3PO_4$
  90 grams of $KMnO_4$
  30 grams of Flake graphite (between 50 and 250 mesh)
  1200 ml $H_2O$ (Distilled water for step "h")
    (preferably, RO water should not be used)
  1200 ml $H_2O$ (Distilled water for step "i")
    (preferably, RO water should not be used)
  450 ml of 35% $H_2O_2$ (step "j")
  Note: Total final fluid volume (end of process) in the reactor is approximately 4,050 ml.

In a preferred embodiment, a method produces graphene oxide with an open layered structure having, for the most part, 5 layers or less. In the present process, unreacted graphite is generally less than 3% by weight and, with attention to detail, 0.3% can be achieved. Unreacted graphite settles out and drops to the bottom of the reaction vessel quite rapidly and tends to remain there even when transferring the batch to a separate beaker for washing, although a 45 to 100 micron filter may be used to separate the greatest part of any unreacted graphite, which material tends to remain fairly large in terms of particle size.

In another preferred embodiment, the ratio of sulfuric acid to phosphoric acid is preferably 75/25 by volume respectively. The presence of 25 percent $H_3PO_4$ in combination with the continuous addition of atmospheric oxygen and the force-in-shear provided by the wire whips contribute to the initial mechanical exfoliation of the graphite precursors and in one embodiment, obviates the necessity for chemical exfoliants like nitric acid, sodium nitrate, potassium ferrate, etc., the use of which has been a common practice since the inception of the Hummers and related methods.

In yet another preferred embodiment, regardless of batch size, the ratio of potassium permanganate to graphite is preferably 3 to 1 by weight respectively. It has been found in several embodiments that deviations from this initial ratio will have a significant negative impact on conversion efficiency and yield.

In a further preferred embodiment, the volume of $H_2O$ added at step "h" is approximately, and preferably precisely equal to the initial total volume of acids for a given batch size, and the volume of $H_2O$ added at step "i" is approximately, and preferably precisely equal to the initial total volume of acids for a given batch size.

In yet another preferred embodiment, the volume of $H_2O_2$ added at step (j) is approximately, and preferably precisely equal to one half the initial volume of $H_2SO_4$ for a given batch size.

In another preferred embodiment, said method further comprises allowing the few-layer graphene suspension obtained after step (j) to cool and settle over a period of from 12 to 14 hours, then drawing or pouring off the remaining acidic water, or filtering and subsequently washing in the same manner three times with distilled water and HCl while maintaining a PH between 2 and 4. The fourth washing is done with distilled water to any desired GO concentration, with the addition of HCl or $H_2SO_4$ until a pH of 4 or less is reached. Sonication at 20 to 40 kHz for from five to fifteen minutes, a process well known in the prior art, may then be applied to accomplish further separation of layers and/or reduction in particle size. Care should be taken to limit the temperature of the sample during sonication to less than about 35 degrees C.

The result in various embodiments will be both single and few layer colloidal graphene oxide with a very small percentage of particulate graphene oxide which settles out almost immediately along with an even smaller percentage of unreacted graphite.

Figure 4:
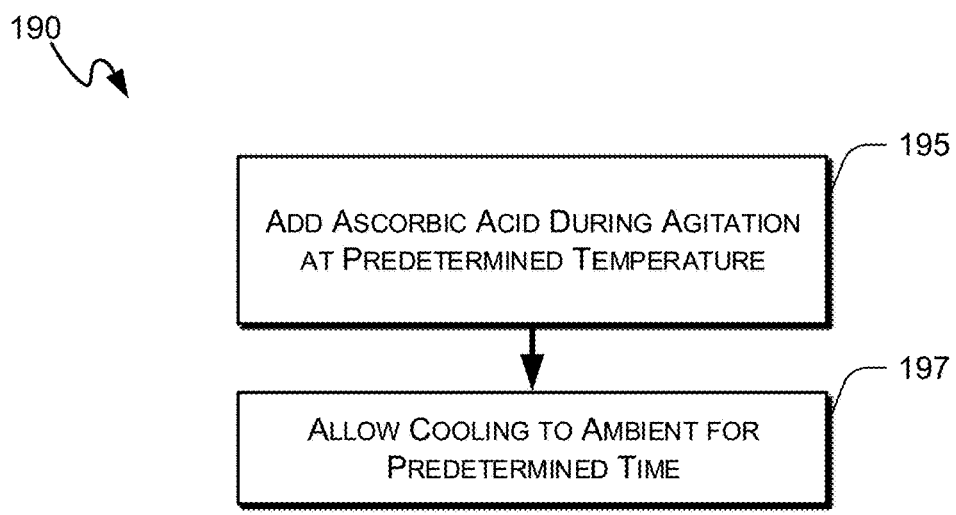
FIG. 4 provides a more detailed flow diagram of the optional graphene oxide reduction process hot stage processing of an embodiment of the present invention.

The Reduction of Graphene Oxide (See Generally FIG. 4)

Optional reduction of Graphene Oxide produced by this method, to graphene, as illustrated in FIG. 4, and is accomplished at 40 to 50 degrees C. with the addition of ascorbic acid while stirring. The reduction to graphene and the final exfoliation to a single layer morphology will complete over a period of several hours as the batch cools to ambient temperature. Twenty four hours is usually sufficient for any quantity to reduce completely. Other methods of reduction commonly known may be utilized, but the reduction by ascorbic acid produces a most satisfactory result. Close control of the temperature and the amount of ascorbic acid can result in varying degrees of partial reduction if so desired.

As is well known by practitioners in the art, the characteristics and morphologies of nano oxides, including those of the carbon allotropes, are highly sensitive to the circumstances and processes under which they were created. Graphite precursors and the graphenes derived from them can be obtained by many different methods and the differences in both the precursor carbons and the synthesis procedures can result in variable success rates, yields and morphologies.

Graphene oxide produced by the process herein described is highly oxygenated, both few and single layer, transparent and veil-like in appearance and, as an acidic dispersion in water, has the appearance of a brilliant yellow-gold, virtually indistinguishable initially from elemental gold flake in suspension.

Graphene produced by the process herein described and reduced with ascorbic acid is single layer, transparent and veil-like in appearance. The TEM morphology (FIG. 10) confirms that this material is single layer graphene and not amorphous carbon.

Various experiments were undertaken to produce graphene oxide with different starting particle sizes. From these experiments, it became evident that a starting particle size preferably between 50 mesh and 250 mesh and most preferably between 100 and 150 mesh, produced a process success rate approaching 100 percent, with high yields, while size deviations in either direction resulted in batch failures of one sort or another. Additional experimental results follow.

During various experiments, as starting particle size was increased, the yield of GO decreased and the percentage of unreacted carbon increased, more or less linearly, even when the duration of the "cool" stage was increased to more than fourteen hours. The mode of failure was in yield percentage and likely resulted from a failure to break up the larger particles such that only the outer surface layers became oxidized, leaving a "core" of unreacted graphite which, upon subsequent exfoliation, contaminated the batch.

In other experiments, as starting particle size was decreased, and at a particle size of about 300 mesh, batch failures began to occur wherein, after all indications of a successful "cool" stage, the "Hot" stage inexplicably failed to produce any graphene oxide at all in most cases. The mode of failure was in the process itself and resulted each time in the loss of all reactants. It became evident that these process failures most likely resulted from the fact that the much smaller starting particles were exfoliating into few and single-layer materials while still in the "cool" stage and that in the subsequent "Hot" stage, failed to oxidize even with the final addition of $H_2O_2$. Reducing the "cool" stage processing time extended the advent of batch failures to a particle size of about 325 mesh at which point the batch failure rate was still about 40 percent.

From additional experimentation and results, it was determined that, few layer (FLG) and single layer graphene (SLG) cannot be reliably oxidized chemically and that this fact is responsible for a large percentage of the Hummers method process failures reported by researchers and in the literature.

Qualitative Analysis of the Graphene Oxides of the Present Invention

X-ray Diffraction (XRD)

Figure 5:
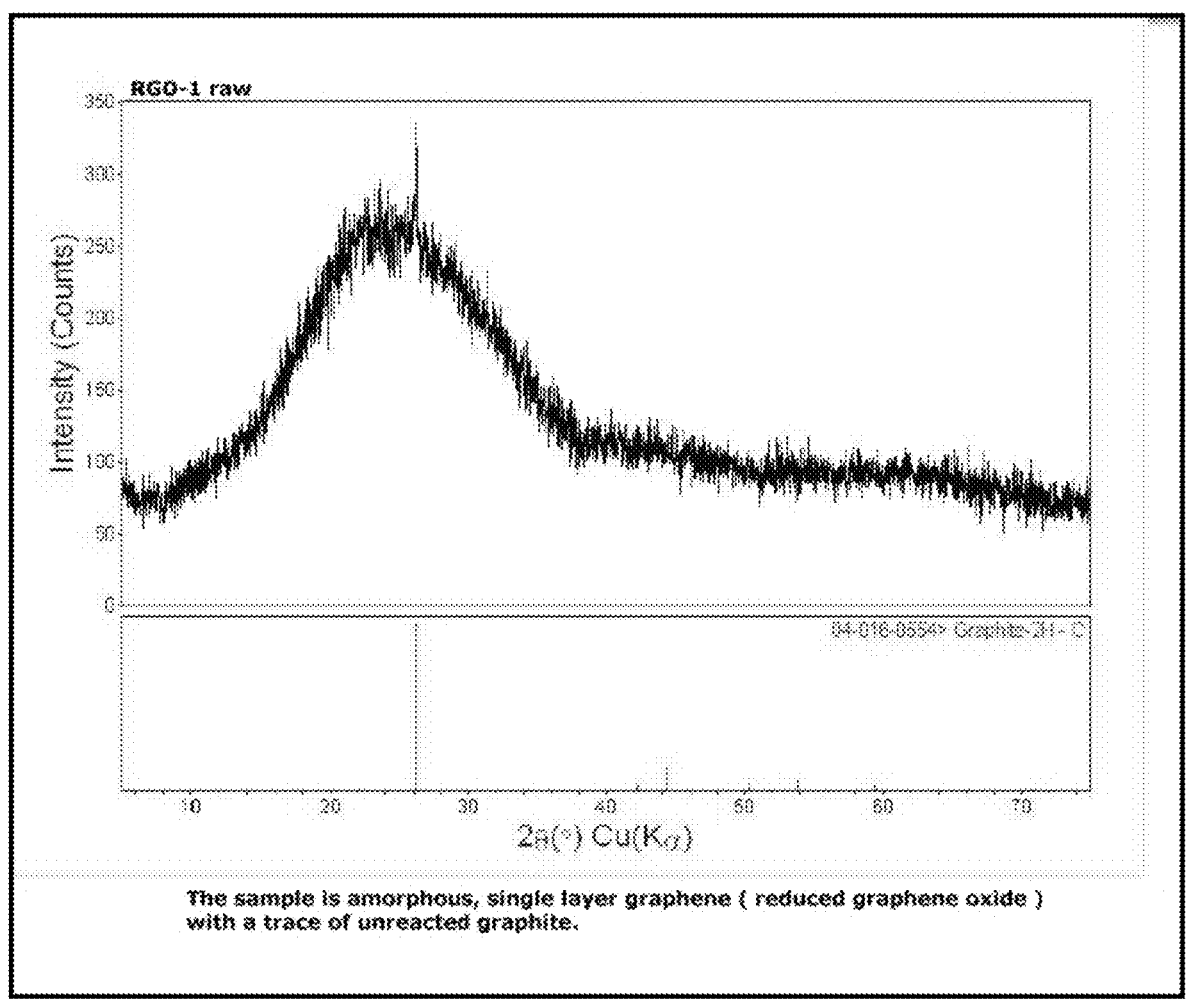
FIG. 5 illustrates an XRD diagram of reduced graphene oxide produced by methods and systems of the present invention.
Figure 6:
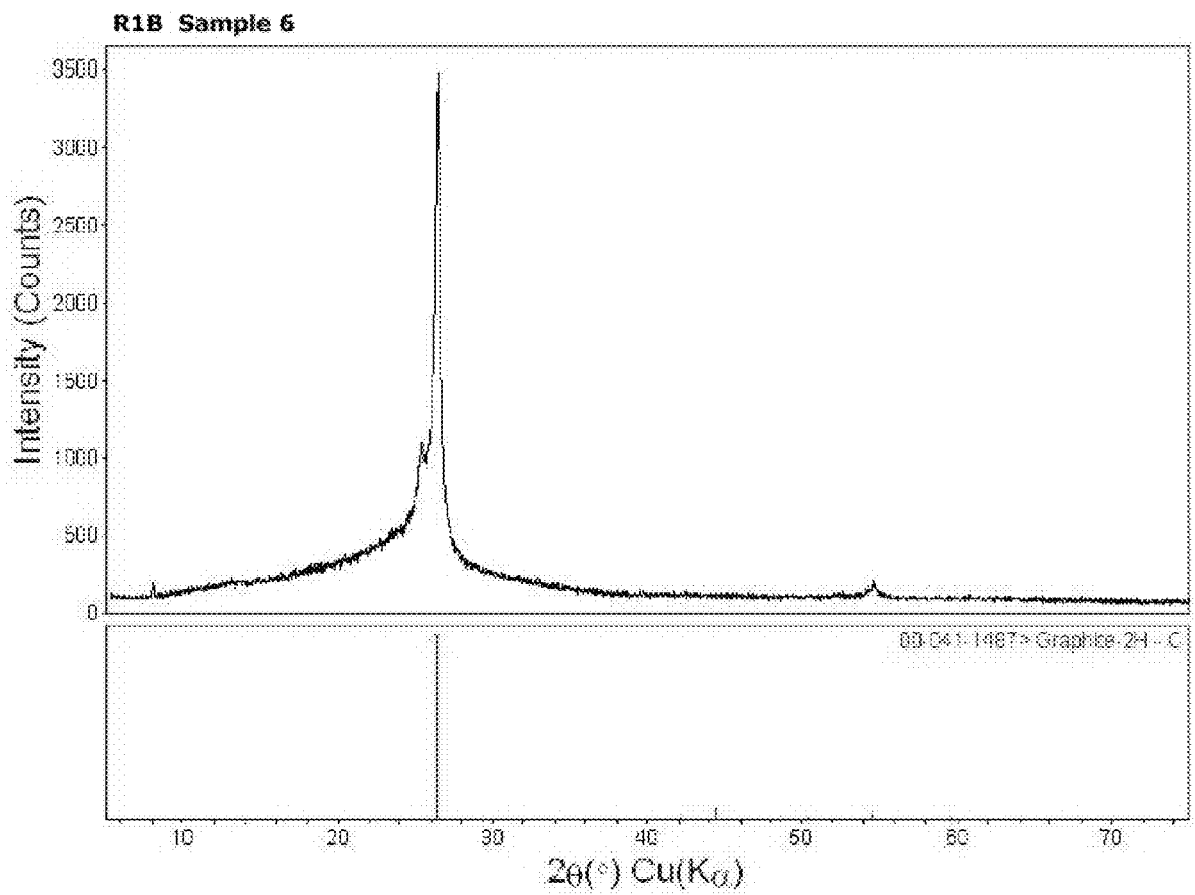
FIG. 6 illustrates an XRD diagram of the graphite precursor as used in accordance with by methods and systems of the present invention.
Figure 7:
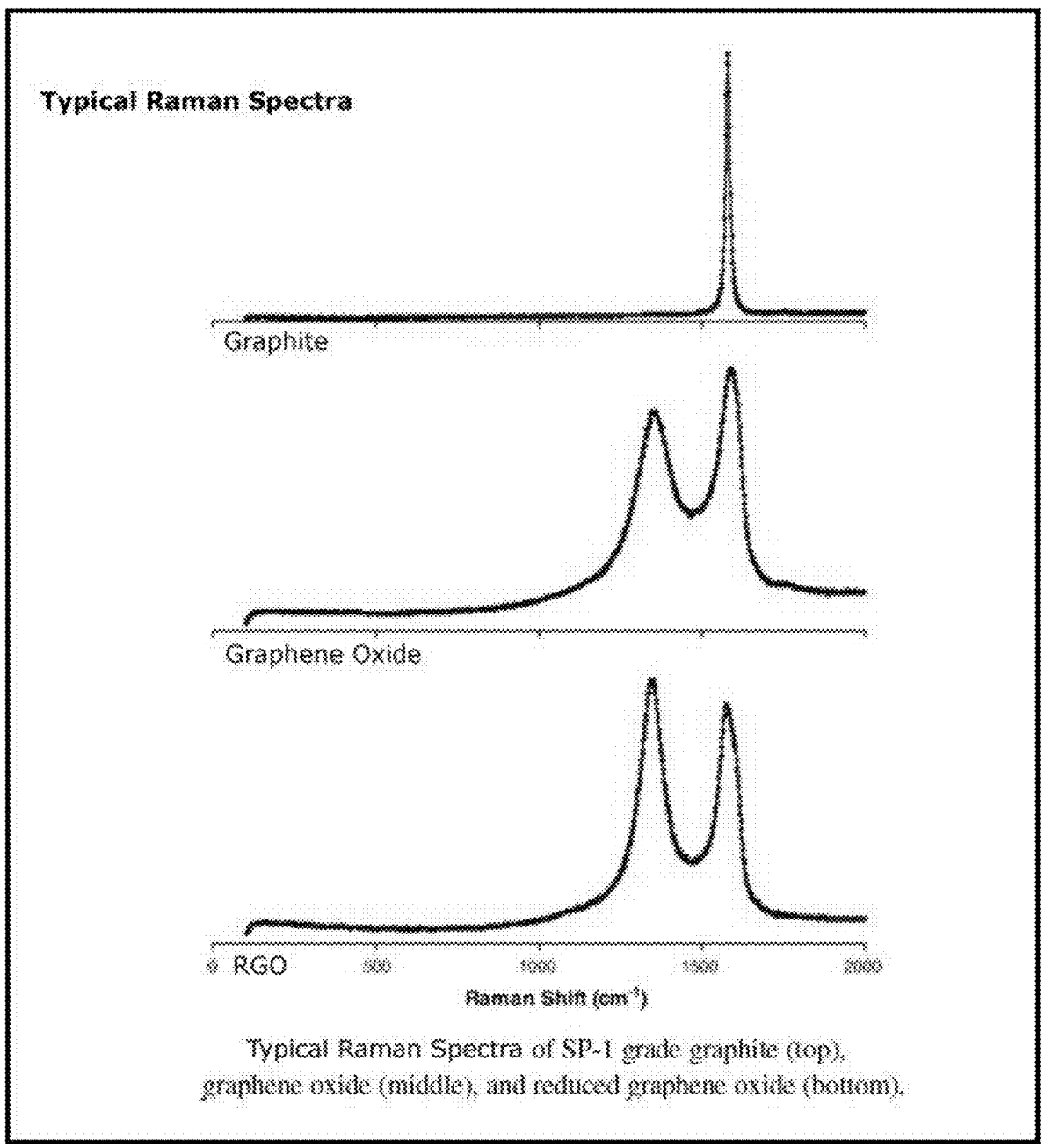
FIG. 7 illustrates comparative Raman spectra typical of graphite, graphene oxide and reduced graphene oxide (graphene).

The RGO and Graphite precursor samples, 1 (See, e.g., FIG. 5) and 6 (See, e.g. FIG. 6) respectively, were subjected to XRD analysis. Data was collected using Cu-Kα radiation by D-max X-ray diffractometer (Rigaku) ($\lambda$=1.54018 □, angle=4°). See FIGS. 5 and 6, respectively.

The graphene oxide (GO) obtained by the process of the present invention was subjected to XRD analysis (FIGS. 12-15) proving that the graphene oxide of the present invention has both a single and few-layer structure and indicates that the graphene oxide sheets are crystalline rather than amorphous.

Figure 9:
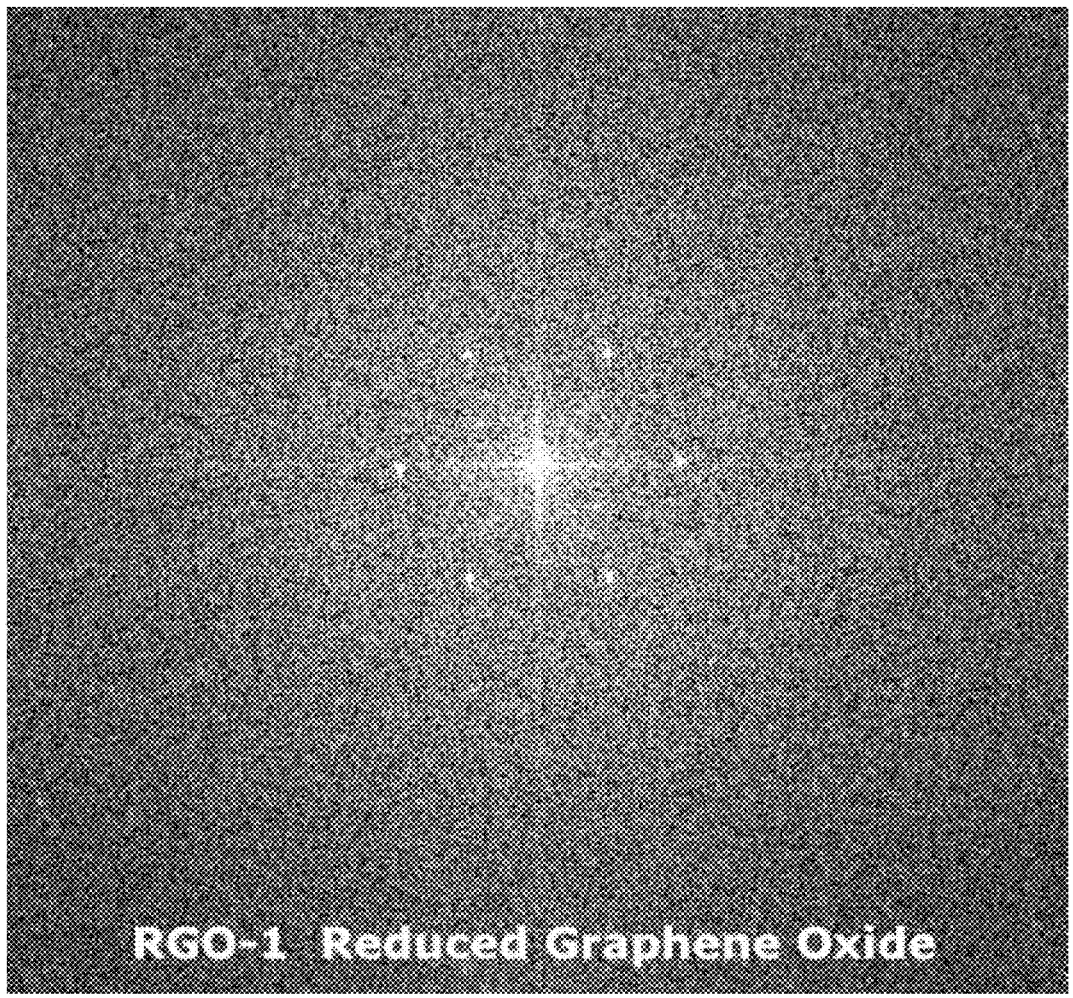
FIG. 9 illustrates an SAED image of the reduced graphene oxide produced by a process of the present invention.
Figure 10:
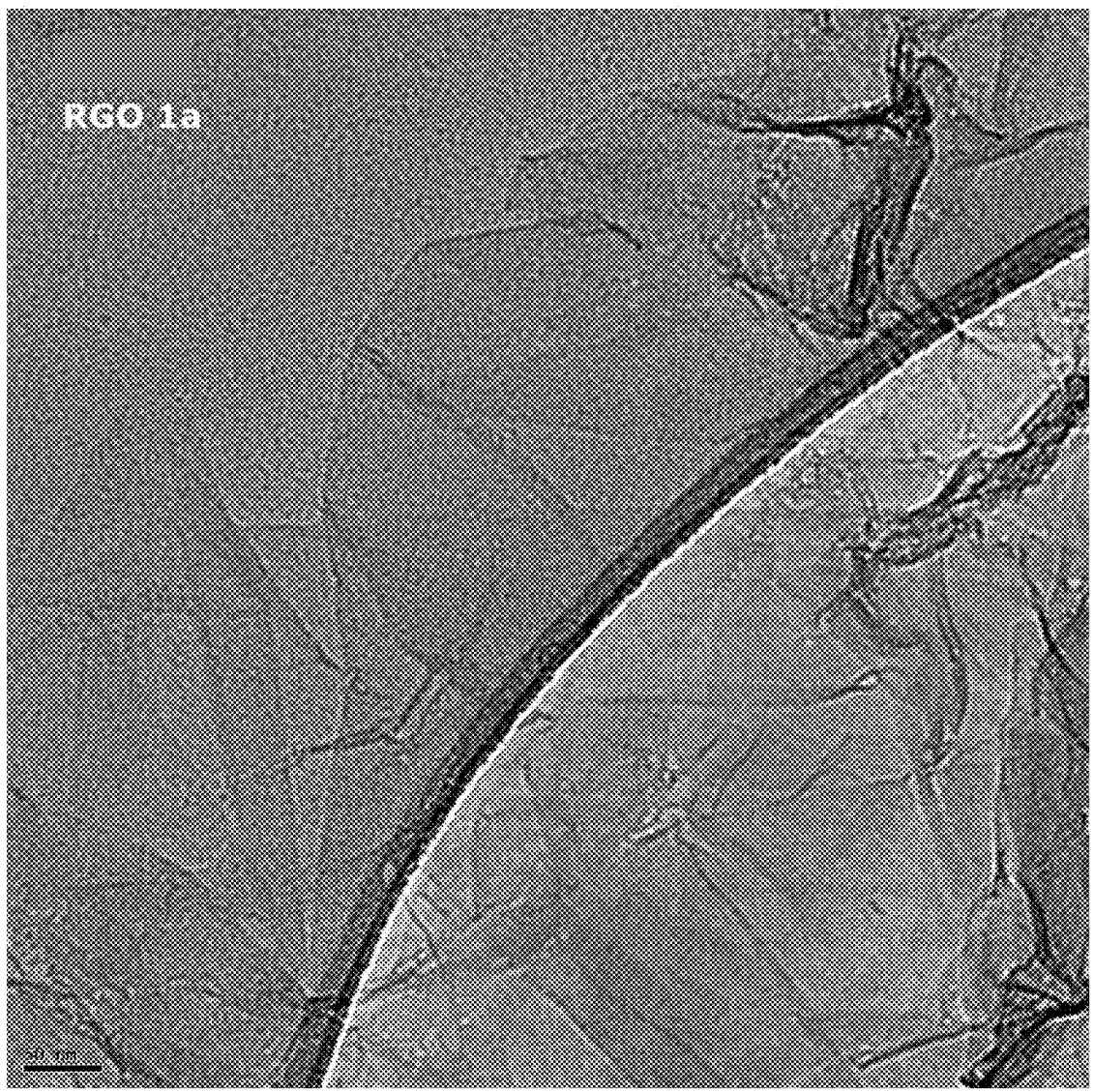
FIG. 10 illustrates a TEM image of single layer graphene (RGO) produced by a process of the present invention.
Figure 11:
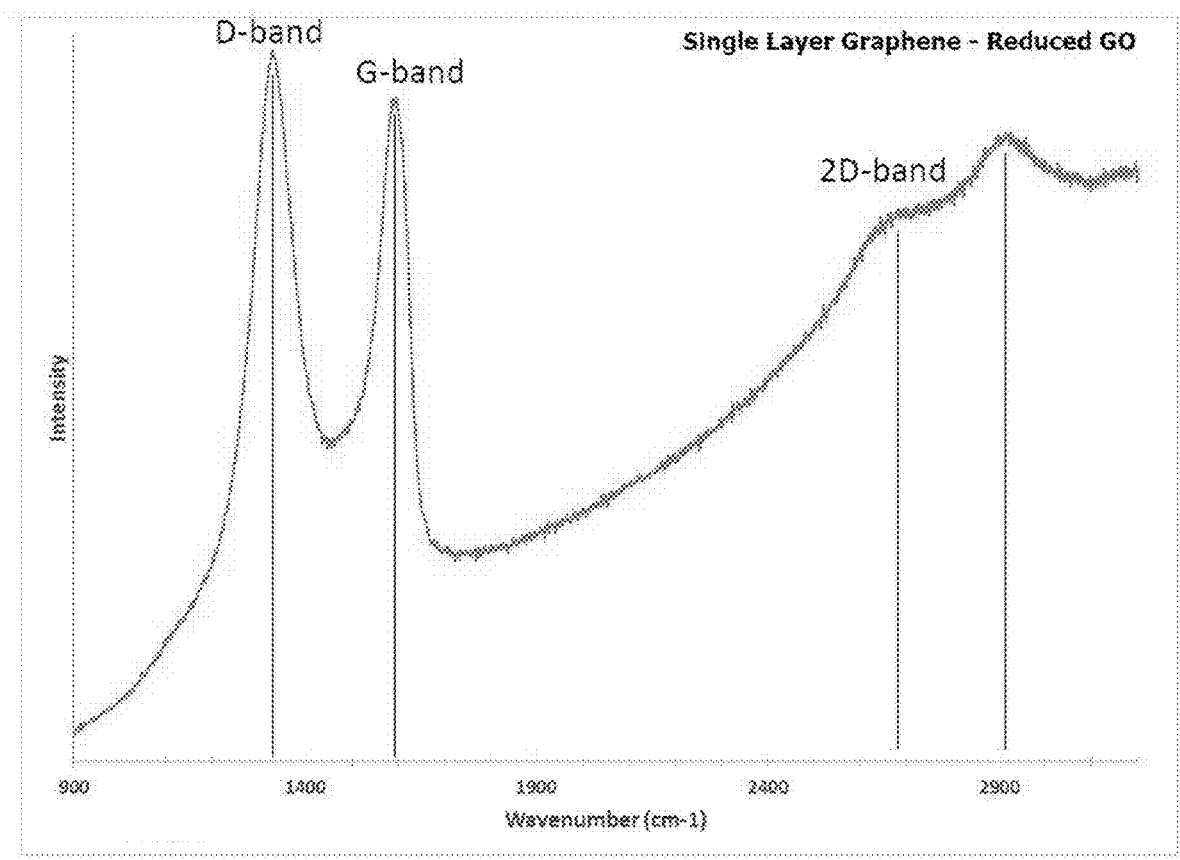
FIG. 11 illustrates a Raman Spectra of RGO produced by a process of the present invention.
Figure 12:
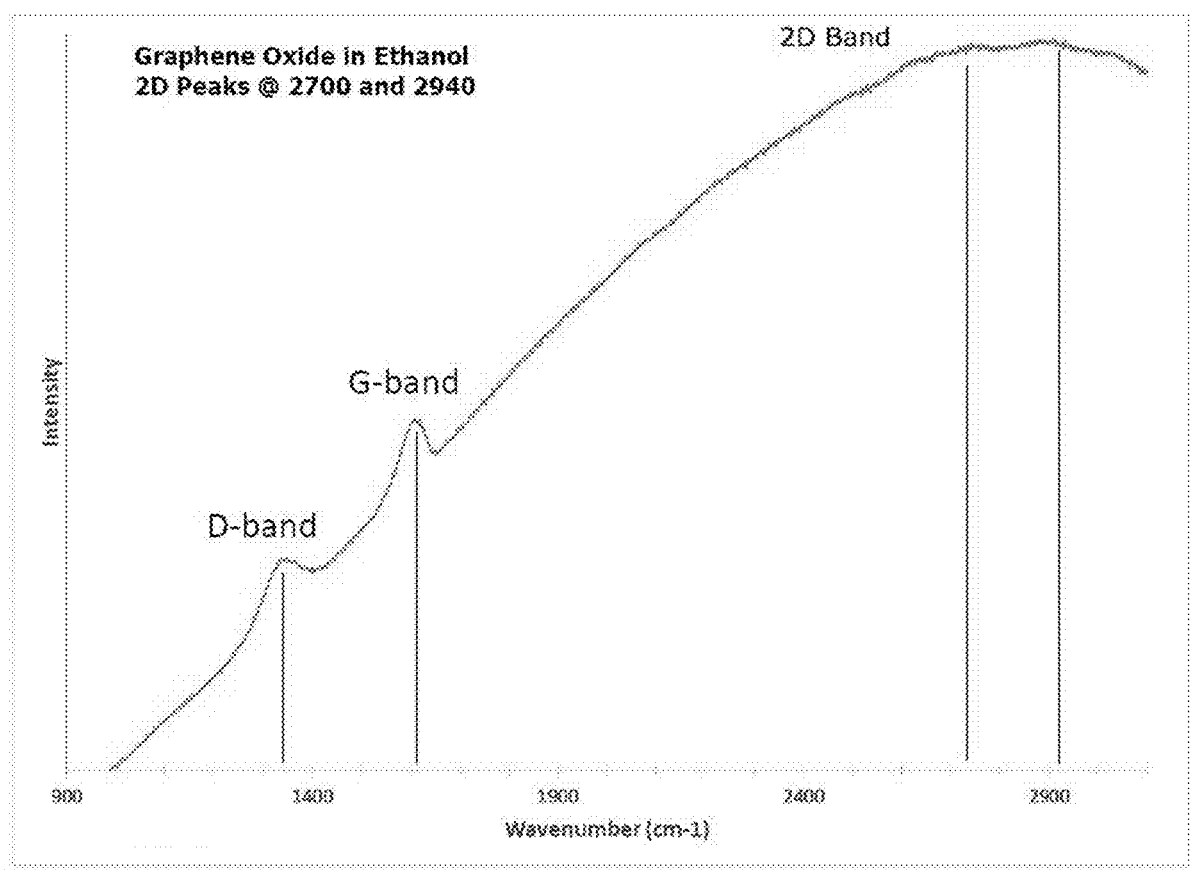
FIG. 12 illustrates another Raman Spectra of a GO film from GO in Ethanol produced by a process of the present invention.
Figure 13:
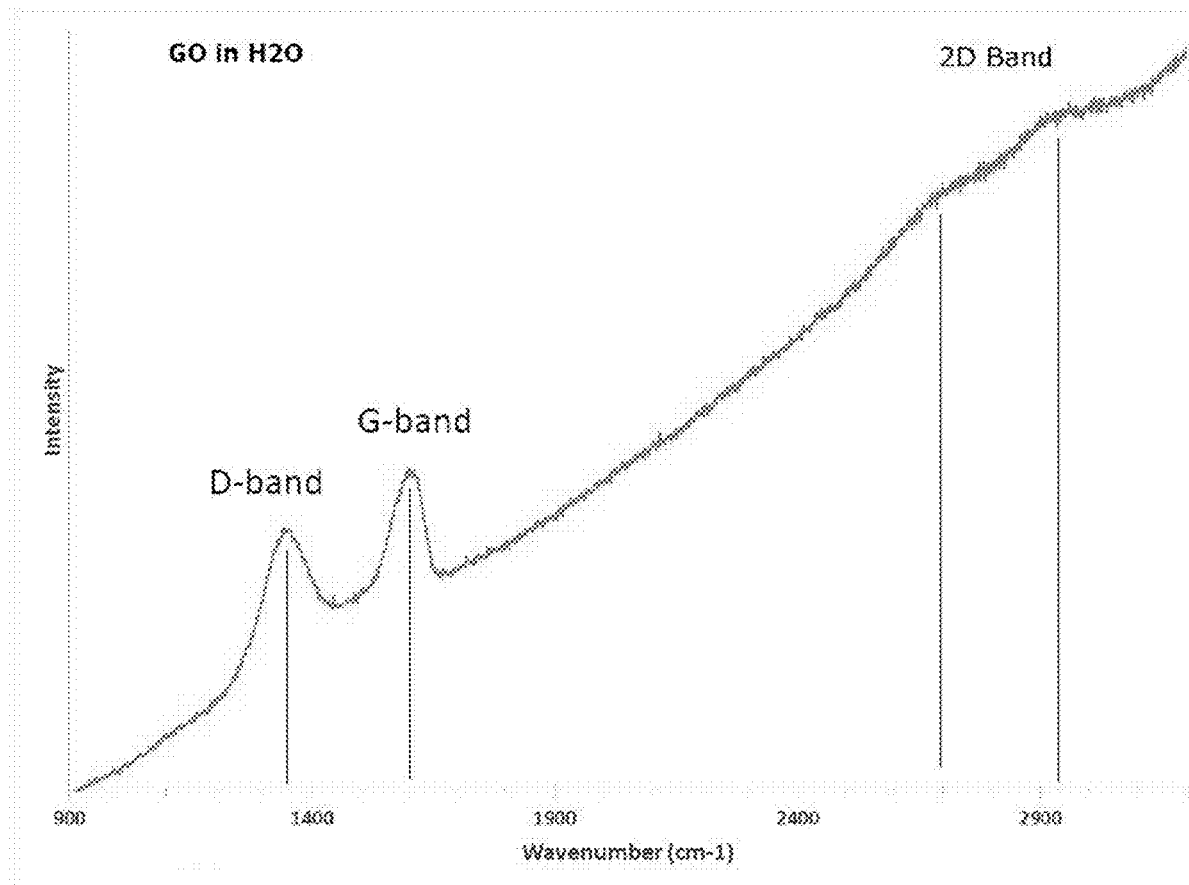
FIG. 13 illustrates yet another Raman Spectra of a GO film from GO produced by a process of the present invention.
Figure 14:
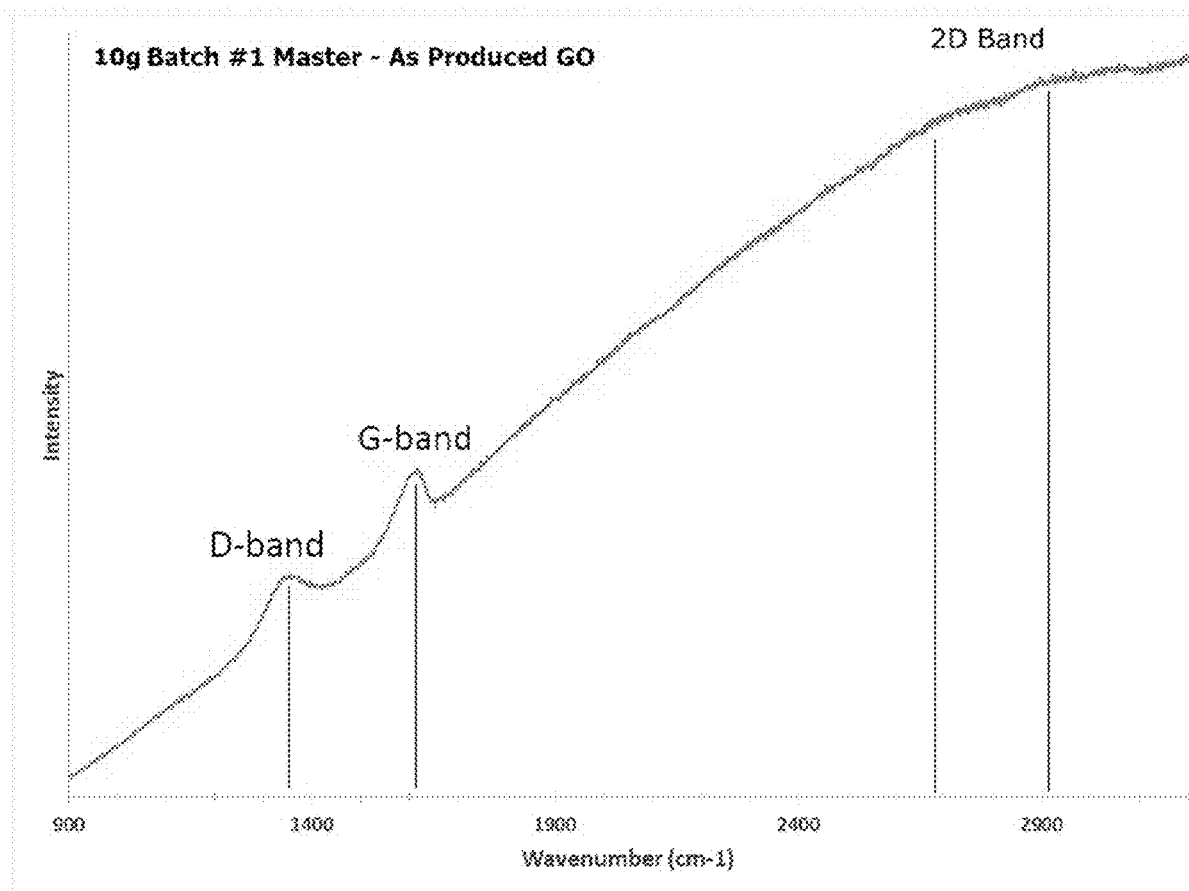
FIG. 14 illustrates a Raman Spectra corresponding to GO film from GO as produced in the 10 gram batch of Example #1 below.
Figure 15:
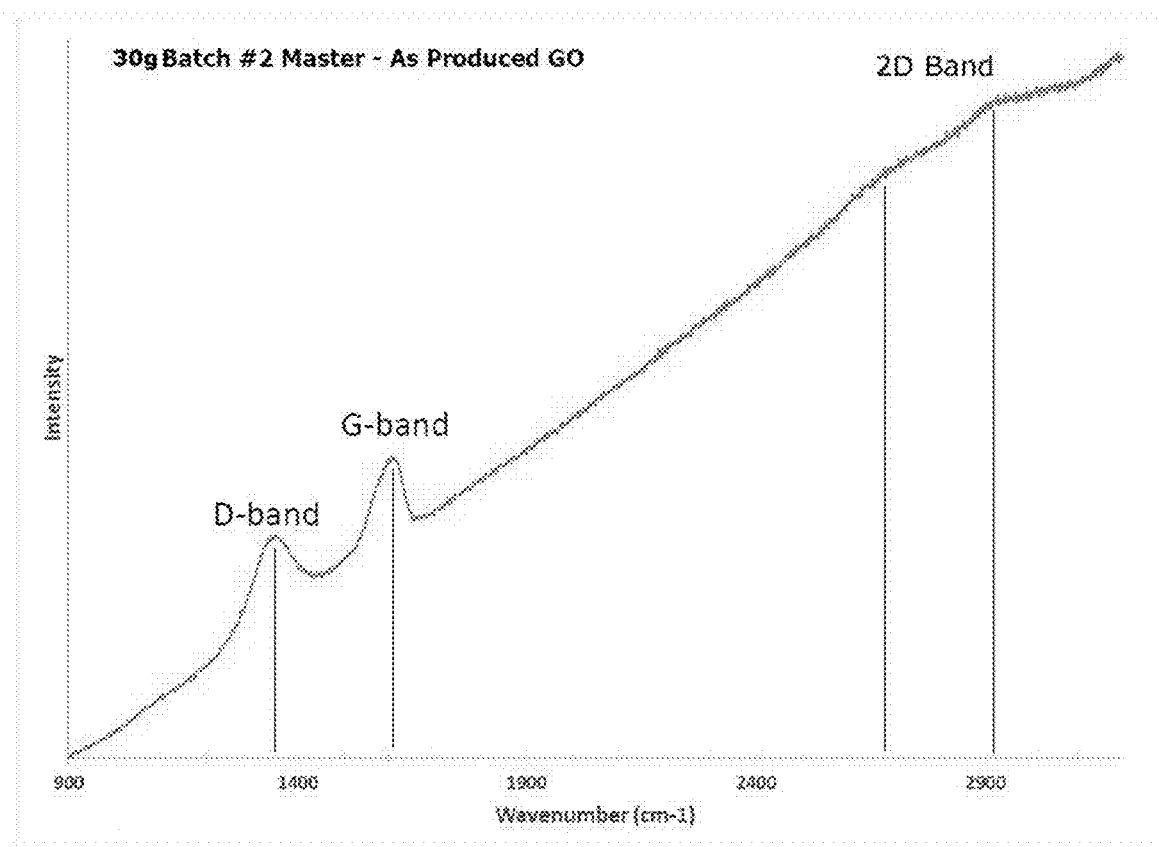
FIG. 15 illustrates a Raman Spectra corresponding to GO film from GO as produced in the 30 gram batch of Example #2 below.
Figure 16:
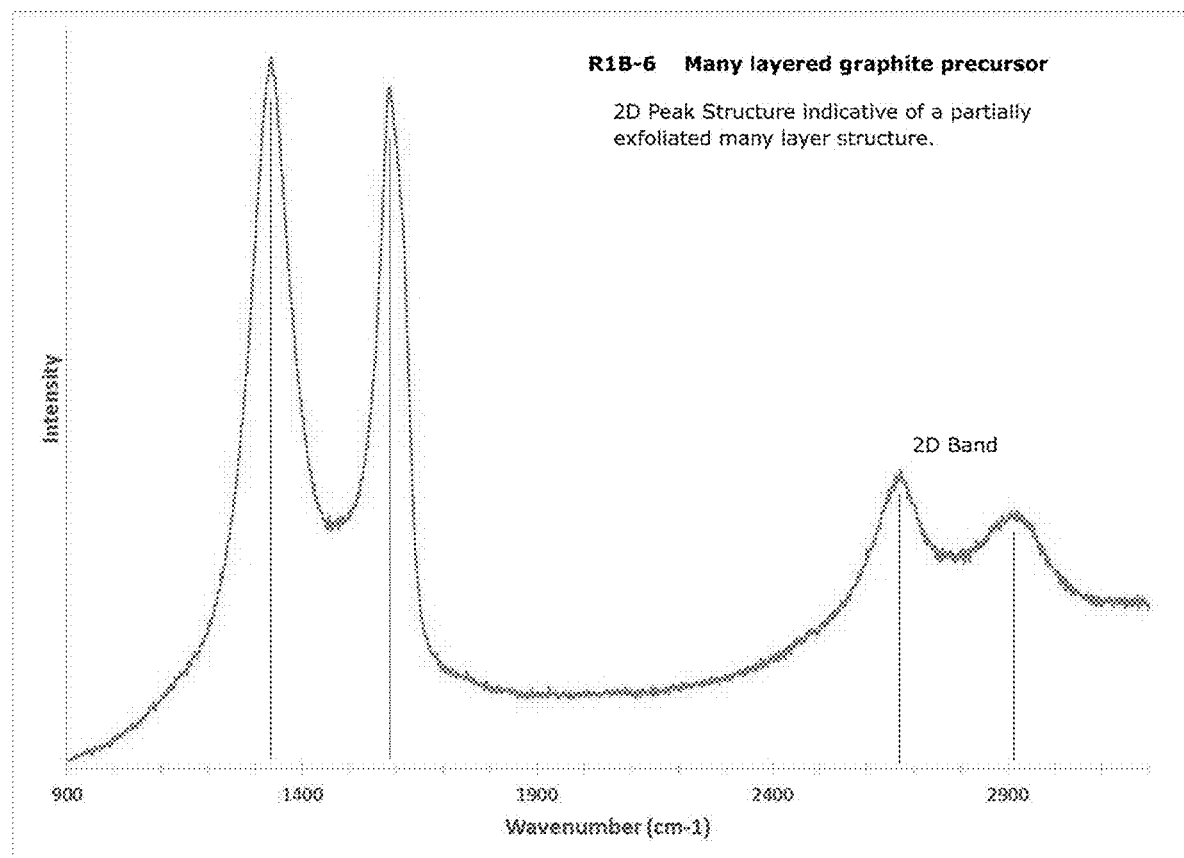
FIG. 16 illustrates a Raman Spectra of the #1 Flake precursor of Example #1 below.
Figure 18:
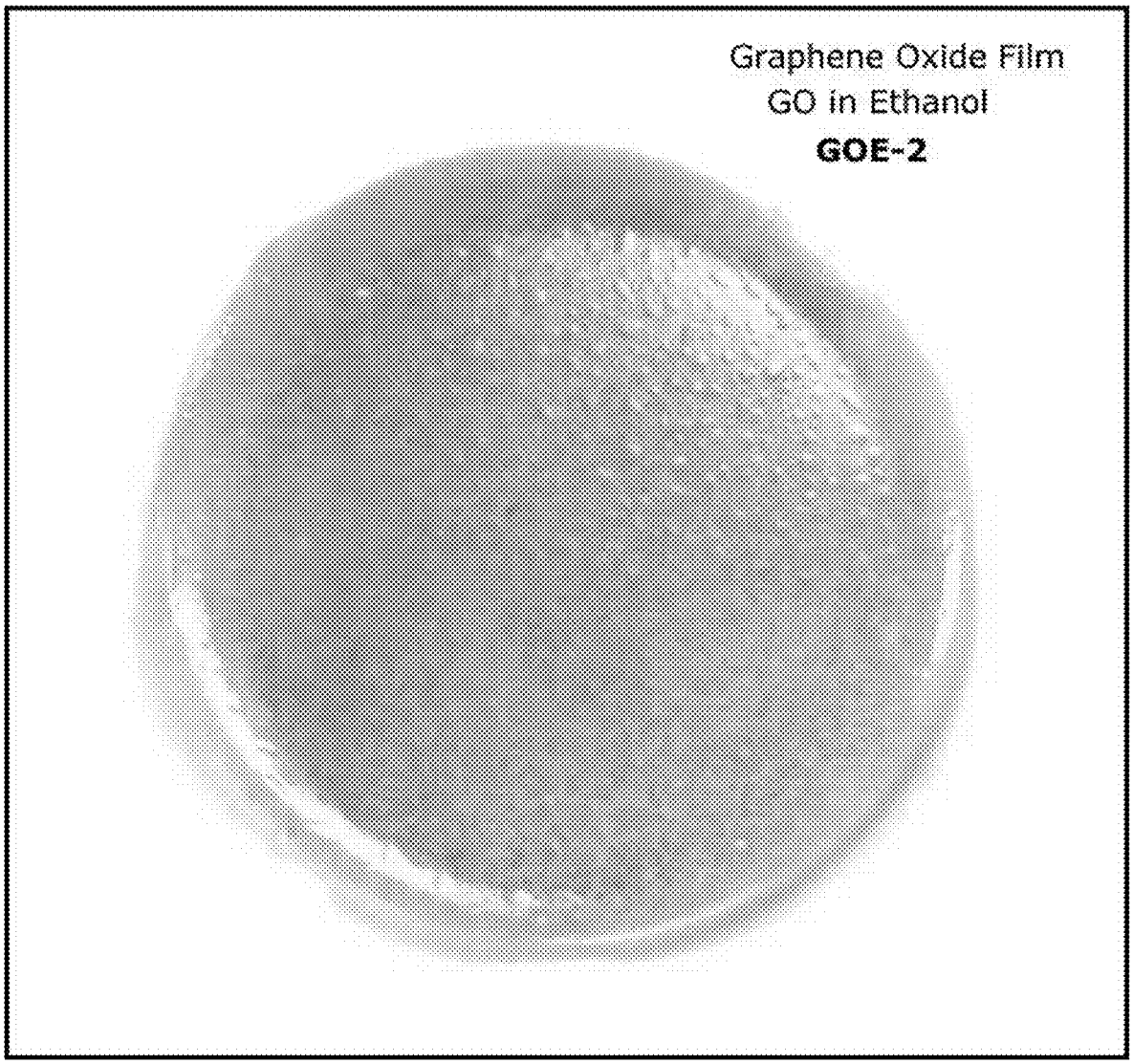
FIG. 18 illustrates an image of graphene oxide film of sample #2 produced from a dispersion of GO in ethanol.

The reduced graphene oxide (RGO) obtained by the process of this invention was also subjected to IBM and SAED analysis (FIGS. 10 and 9, respectively). It is apparent from these analyses that the RGO of the present invention is amorphous, silky and veil-like and has a single layer structure, the RGO sheets are also highly transparent.

Raman Spectroscopy

The graphene oxide Samples 2 thru 5 obtained in Examples 1 and 2 were subjected to Raman analysis. Data was collected by an RM1000 Raman spectrometer (Renishaw) using a 633 nm laser.

Raman spectra peak distributions for all samples are shown in FIG. 17. Two major peaks located near 1350 cm$^{-1}$ (the D-band) and 1580 cm$^{-1}$ (G-band) are observed in all spectra. The G-band signatures show that the graphene oxide comprises a graphitic structure, and the D-band signatures indicate edge defects typical of the crystalline nature of the GO as produced. Raman spectrometry shows that the graphene oxide of the present invention has a 2D graphene peak distribution which is a characteristic of both single and few-layer structures.

The precursor material used for preparing graphene oxide by the process of this invention, graphite flake, is a block material. For producing graphene oxide, conventional wet-chemical methods usually sieve and select relatively small graphite particles, cleaving the graphite layers thereof, and then synthesizing graphene oxide through an exfoliation process that depends upon a chemical exfoliation agent like sodium nitrate, nitric acid, potassium ferrate or the like.

The method of the present invention does not require the graphite particle sieving step ahead of the process but selects a particular commercially available particle size within a range between 50 mesh and 250 mesh as being prerequisite to a predictably successful process. Asbury #1 (50 or 100 mesh) flake graphite is typical of a suitable graphite for the purposes of the present invention.

It is to be understood that this invention is not limited to the specific devices, methods, conditions, or parameters described and/or shown herein, and that the terminology used herein is for the purpose of describing particular embodiments by way of example only. Indeed, these examples are not intended to be all-inclusive of the possible implementations of this invention. Thus, the terminology is intended to be broadly construed and is not intended to be limiting of the claimed invention. For example, as used in the specification including the appended claims, the singular forms "a," "an," and "one" include the plural, the term "or" means "and/or," and reference to a particular numerical value includes at least that particular value, unless the context clearly dictates otherwise. In addition, any methods described herein are not intended to be limited to the sequence of steps described but can be carried out in other sequences, unless expressly stated otherwise herein.

While the invention has been shown and described in exemplary forms, it will be apparent to those skilled in the art that many modifications, additions, and deletions can be made therein without departing from the spirit and scope of the invention as defined by the following claims. The particular implementations shown and described above are illustrative of the invention and its best mode and are not intended to otherwise limit the scope of the present invention in any way. Indeed, for the sake of brevity, conventional data storage, data transmission, and other functional aspects of the systems may not be described in detail. Methods illustrated in the various figures may include more, fewer, or other steps. Additionally, steps may be performed in any suitable order without departing from the scope of the invention. Furthermore, the connecting lines shown in the various figures are intended to represent exemplary functional relationships and/or physical couplings between the various elements. Many alternative or additional functional relationships or physical connections may be present in a practical system.

Changes and modifications may be made to the disclosed embodiments without departing from the scope of the present invention. These and other changes or modifications are intended to be included within the scope of the present invention, as expressed in the following claims.

What is claimed is:

1. A method comprising:
   chilling a reaction vessel to a predetermined chill temperature;
   intermixing a quantity of two or more acid reactants to form an intermixed acid mixture;
   chilling the intermixed acid mixture to the predetermined chill temperature;
   intermixing a quantity of $KMnO_4$ and a quantity of graphite;
   chilling the intermixed $KMnO_4$ and graphite to the predetermined chill temperature;
   placing the chilled intermixed acid mixture into the chilled reaction vessel and initiating a low speed agitation of the acid mixture;
   adding the chilled intermixed $KMnO_4$ and graphite to the chilled reaction vessel to form a graphite suspension;
   continuing agitation of the reaction vessel for a predetermined period of cool agitation while maintaining the reaction vessel within a predetermined cool temperature profile;
   adding a first volume of warm distilled water during a first period of warm agitation while the graphite suspension is agitated;
   adding a second volume of distilled water during a second period of warm agitation while the graphite suspension is agitated;
   while agitating, cooling the graphite suspension to a predetermined pre-peroxide temperature;
   adding a predetermined amount of hydrogen peroxide to the reaction vessel;
   allowing contents of the reaction vessel to cool and settle over a settling period; and
   separating colloidal graphene oxide from reaction products within the vessel contents; and
   wherein the method further comprises one or more of the following:
   (a) adding the first volume of warm distilled water to the reaction vessel at a controlled rate between 2 ml/min and 5 ml/min so as to maintain the temperature of contents of the reaction vessel between 80 and 90 degrees C.; and
   (b) wherein the second volume of warm distilled water is approximately equal to a volume of the intermixed acid mixture.

2. The method of claim 1, further comprising reducing the graphene oxide by:
   adding ascorbic acid to the colloidal graphene oxide while agitating and maintaining the colloidal graphene oxide/ascorbic acid mixture at a predetermined reduction temperature; and
   allowing the colloidal graphene oxide/ascorbic acid mixture to cool to an ambient temperature for a determined reduction period.

3. The method of claim 1, wherein the predetermined chill temperature is approximately 0 degrees C.

4. The method of claim 1, wherein the two or more acid reactants include a quantity of $H_2SO_4$ and a quantity of $H_3PO_4$.

5. The method of claim 1, wherein the intermixed acid mixture comprises sulfuric acid and phosphoric acid in a ratio of approximately 75/25 by volume, respectively.

6. The method of claim 1, wherein a ratio of the quantity of $KMnO_4$ and the quantity of graphite is 3 to 1 by weight, respectively.

7. The method of claim 1, wherein graphite suspension placed into the chilled reaction vessel is in gaseous communication with atmospheric oxygen.

8. The method of claim 1, wherein the predetermined period of cool agitation comprises a period of four to eight hours.

9. The method of claim 1, wherein the predetermined cool temperature profile comprises one or more of:
   maintaining a temperature of the graphite suspension below 50 degrees C. over the first 90 minutes of the predetermined period of cool agitation;
   providing a continuously rising temperature profile of the graphite suspension from about zero degrees C. to about 45 degrees C., over an initial 60 to 90 minutes of the predetermined period of cool agitation;
   maintaining a temperature profile of the graphite suspension to prevent temperatures from plateauing for more than five minutes during the predetermined period of cool agitation;
   maintaining temperature of the graphite suspension between 40 and 45 degrees C. with a PID thermal control loop; and
   cooling the graphite suspension during a first 15 to 30 minutes of the predetermined period of cool agitation and thereafter allowing the temperature the graphite suspension to rise to between 40 to 45 degrees C. over about 90 minutes of the predetermined period of cool agitation and then remain at a temperature between 40 to 45 degrees C. a remainder of the predetermined period of cool agitation.

10. The method of claim 1, wherein the first volume of warm distilled water is heated to 50 to 80 degrees C.

11. The method of claim 1, wherein the first period of warm agitation comprises a period of time from 45 to 60 minutes.

12. The method of claim 1, wherein the first volume of warm distilled water is approximately equal to a volume of the intermixed acid mixture.

13. The method of claim 1, wherein the reaction vessel further comprises a PID thermal control loop and a heating and/or cooling apparatus interface.

14. The method of claim 1, wherein the second volume of warm distilled water is heated to approximately 90 degrees C.

15. The method of claim 1, wherein the predetermined pre-peroxide temperature is approximately 50 degrees C.

16. The method of claim 1, wherein a concentration of the hydrogen peroxide is 35% by volume.

17. The method of claim 1, wherein a volume of the hydrogen peroxide is approximately equal to one half an initial volume of $H_2SO_4$ used in the intermixed acid mixture.

18. The method of claim 1, wherein the agitation further comprises a stainless steel multi-wire whip rotating within the reaction vessel at a predetermined speed.

19. The method of claim 1, wherein the settling period is within the range of 12 to 14 hours.

20. The method of claim 2, wherein the predetermined reduction temperature is within the range of 40 to 50 degrees C.

21. The method of claim 2, wherein the determined reduction period ranges from one of:
   1 to 10 hours;
   until the graphene oxide/ascorbic acid mixture obtains ambient temperature; or
   24 hours.

22. A method comprising:
   chilling a reaction vessel to a predetermined chill temperature;
   intermixing a quantity of two or more acid reactants to form an intermixed acid mixture;
   chilling the intermixed acid mixture to the predetermined chill temperature;
   intermixing a quantity of $KMnO_4$ and a quantity of graphite;
   chilling the intermixed $KMnO_4$ and graphite to the predetermined chill temperature;
   placing the chilled intermixed acid mixture into the chilled reaction vessel and initiating a low speed agitation of the acid mixture;
   adding the chilled intermixed $KMnO_4$ and graphite to the chilled reaction vessel to form a graphite suspension;
   continuing agitation of the reaction vessel for a predetermined period of cool agitation while maintaining the reaction vessel within a predetermined cool temperature profile;
   adding a first volume of warm distilled water during a first period of warm agitation while the graphite suspension is agitated;
   adding a second volume of distilled water during a second period of warm agitation while the graphite suspension is agitated;
   while agitating, cooling the graphite suspension to a predetermined pre-peroxide temperature;
   adding a predetermined amount of hydrogen peroxide to the reaction vessel;
   allowing contents of the reaction vessel to cool and settle over a settling period;
   separating colloidal graphene oxide from reaction products within the vessel contents; and
   wherein:
   the intermixed acid mixture comprises approximately 300 ml of 98% $H_2SO_4$ and 100 ml of 85% $H_3PO_4$;
   the $KMnO_4$ comprises approximately 30 grams of potassium permanganate;
   the graphite comprises approximately 10 grams of flake graphite between about 50 and 250 mesh in size;
   the first volume of warm distilled water comprises approximately 400 ml of distilled $H_2O$;
   the second volume of warm distilled water comprises approximately 400 ml $H_2O$; and
   the predetermined amount of hydrogen peroxide comprises approximately 150 ml of 35% $H_2O_2$.

23. A method comprising:
   chilling a reaction vessel to a predetermined chill temperature;
   intermixing a quantity of two or more acid reactants to form an intermixed acid mixture;
   chilling the intermixed acid mixture to the predetermined chill temperature;
   intermixing a quantity of $KMnO_4$ and a quantity of graphite;
   chilling the intermixed $KMnO_4$ and graphite to the predetermined chill temperature;
   placing the chilled intermixed acid mixture into the chilled reaction vessel and initiating a low speed agitation of the acid mixture;
   adding the chilled intermixed $KMnO_4$ and graphite to the chilled reaction vessel to form a graphite suspension;
   continuing agitation of the reaction vessel for a predetermined period of cool agitation while maintaining the reaction vessel within a predetermined cool temperature profile;
   adding a first volume of warm distilled water during a first period of warm agitation while the graphite suspension is agitated;
   adding a second volume of distilled water during a second period of warm agitation while the graphite suspension is agitated;
   while agitating, cooling the graphite suspension to a predetermined pre-peroxide temperature;
   adding a predetermined amount of hydrogen peroxide to the reaction vessel;
   allowing contents of the reaction vessel to cool and settle over a settling period;
   separating colloidal graphene oxide from reaction products within the vessel contents; and
   wherein:
   the intermixed acid mixture comprises approximately 900 ml of 98% $H_2SO_4$ and 300 ml of 85% $H_3PO_4$;
   the $KMnO_4$ comprises approximately 90 grams of potassium permanganate;
   the graphite comprises approximately 30 grams of flake graphite between about 50 and 250 mesh in size;
   the first volume of warm distilled water comprises approximately 1200 ml of distilled $H_2O$;
   the second volume of warm distilled water comprises approximately 1200 ml $H_2O$; and
   the predetermined amount of hydrogen peroxide comprises approximately 450 ml of 35% $H_2O_2$.

\* \* \* \* \*